United States Patent
Tian et al.

(10) Patent No.: US 10,708,207 B2
(45) Date of Patent: Jul. 7, 2020

(54) EMOTICON SENDING METHOD, COMPUTER DEVICE AND COMPUTER-READABLE STORAGE MEDIUM

(71) Applicant: Tencent Technology (Shenzhen) Company Limited, Shenzhen (CN)

(72) Inventors: Jiangxue Tian, Shenzhen (CN); Wen Zha, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 138 days.

(21) Appl. No.: 16/041,570

(22) Filed: Jul. 20, 2018

(65) Prior Publication Data
US 2018/0331993 A1 Nov. 15, 2018

Related U.S. Application Data

(63) Continuation-in-part of application No. PCT/CN2017/085034, filed on May 19, 2017.

(30) Foreign Application Priority Data

May 19, 2016 (CN) .......................... 2016 1 0338581

(51) Int. Cl.
*H04L 12/58* (2006.01)
*H04W 76/11* (2018.01)
*H04W 8/22* (2009.01)

(52) U.S. Cl.
CPC ............ *H04L 51/14* (2013.01); *H04L 51/046* (2013.01); *H04L 51/063* (2013.01); *H04L 51/10* (2013.01);
(Continued)

(58) Field of Classification Search
CPC ..... H04L 51/046; H04L 51/063; H04L 51/10; H04L 51/14; H04L 51/28; H04W 76/11; H04W 8/22
See application file for complete search history.

(56) References Cited

U.S. PATENT DOCUMENTS

| | | | |
|---|---|---|---|
| 6,393,464 B1* | 5/2002 | Dieterman | G06Q 10/107 709/206 |
| 2013/0102290 A1* | 4/2013 | Akhtar | H04L 51/28 455/414.1 |
| 2015/0149925 A1* | 5/2015 | Weksler | H04L 51/046 715/752 |

FOREIGN PATENT DOCUMENTS

| | | |
|---|---|---|
| CN | 102427434 A | 4/2012 |
| CN | 103139348 A | 6/2013 |

(Continued)

OTHER PUBLICATIONS

Tencent Technology, ISRWO, PCT/CN2017/085034, Jul. 13, 2017, 6 pgs.
(Continued)

*Primary Examiner* — Michael C Lai
(74) *Attorney, Agent, or Firm* — Morgan, Lewis & Bockius LLP

(57) ABSTRACT

An emoticon sending method, performed at a computer device, includes obtaining an emoticon identifier selected by a sender corresponding to a sender identifier; obtaining a corresponding allowed receiver identifier according to the sender identifier and the emoticon identifier; obtaining a candidate receiver identifier; comparing the candidate receiver identifier with the allowed receiver identifiers; and sending the selected emoticon identifier to the candidate receiver identifier, if the candidate receiver identifier is one of the allowed receiver identifiers.

18 Claims, 7 Drawing Sheets

(52) U.S. Cl.
CPC ............. *H04L 51/28* (2013.01); *H04W 76/11* (2018.02); *H04W 8/22* (2013.01)

(56) References Cited

FOREIGN PATENT DOCUMENTS

| | | | | |
|---|---|---|---|---|
| CN | 103207879 A | * | 7/2013 | ........... G06K 9/4671 |
| CN | 103207890 A | * | 7/2013 | |
| CN | 103207890 A | | 7/2013 | |
| CN | 104753766 A | * | 7/2015 | |
| CN | 104753766 A | | 7/2015 | |
| CN | 105871695 A | | 8/2016 | |

OTHER PUBLICATIONS

Tencent Technology, IPRP, PCT/CN2017/085034, Nov. 20, 2018, 5 pgs.

* cited by examiner

EMOTICON SENDING METHOD, COMPUTER DEVICE AND COMPUTER-READABLE STORAGE MEDIUM

RELATED APPLICATIONS

This application is a continuation-in-part application of PCT/CN2017/085034, entitled "EMOTICON SENDING METHOD, COMPUTER DEVICE AND COMPUTER-READABLE STORAGE MEDIUM" filed on May 19, 2017, which claims priority to Chinese Patent Application No. 201610338581.9, filed with the State Intellectual Property Office of the People's Republic of China on May 19, 2016 and entitled "EMOTICON SENDING METHOD, COMPUTER DEVICE AND COMPUTER-READABLE STORAGE MEDIUM", all of which are incorporated herein by reference in their entirety.

FIELD OF THE TECHNOLOGY

The present disclosure relates to a network application field, and in particular, to an emoticon sending method, a computer device and a computer-readable storage medium.

BACKGROUND OF THE DISCLOSURE

With the development of internet technologies, more users are engaged in social activities by using a network. A variety of social applications provide network communication services, to facilitate users to communicate through the network. The social applications may provide expressing manners such as a text, an image, or an emoticon.

However, the conventional social applications do not have any limitations in the network communication services. Thus, a user can use his/her i-phone to freely select any emoticon and send it to a communication object. When the selected emoticon carries a special meaning that is only suitable to a specific object or a specific group of objects, sending such a selected emoticon to an unspecific object may result in a wrong information transformation. For example, if an emoticon is "baby, I love you," such an emoticon should be only used between lovers, and sending this emoticon to the unspecific object such as a colleague, a boss, a teacher, or an elder may result in the wrong information transformation. Therefore, in order to avoid this social problem, there is a need for a technology that is capable of preventing the above-described wrong information transformation.

SUMMARY

The present disclosure aims to provide such a technology that can solve the above-noted problem. A variety of embodiments of the present application provide an emoticon sending method, a computer device and a non-transitory computer readable storage medium. The technical solutions are as follows According to one aspect of the present disclosure, an emoticon sending method, including:

obtaining an emoticon identifier selected by a sender corresponding to a sender identifier;

obtaining a corresponding pre-configured specified quantity of allowed receiver identifiers according to the sender identifier and the emoticon identifier;

obtaining a candidate receiver identifier;

comparing the candidate receiver identifier with the allowed receiver identifiers; and sending the selected emoticon identifier to the candidate receiver identifier, if the candidate receiver identifier is one of the allowed receiver identifiers.

According to another aspect of the present disclosure, a computer device, including a memory and a processor, the memory storing computer-readable instructions, the instructions, when executed by the processor, causing the processor to perform the following steps:

obtaining an emoticon identifier selected by a sender corresponding to a sender identifier;

obtaining a corresponding pre-configured specified quantity of allowed receiver identifiers according to the sender identifier and the emoticon identifier;

obtaining a candidate receiver identifier;

comparing the candidate receiver identifier with the allowed receiver identifier; and sending the selected emoticon identifier to the candidate receiver identifier, if the candidate receiver identifier is the allowed receiver identifier.

According to still another aspect of the present disclosure, one or more non-volatile computer-readable storage media including computer executable instructions, the computer executable instructions, when executed by one or more processors, causing the processors to perform the following steps:

obtaining an emoticon identifier selected by a sender corresponding to a sender identifier;

obtaining a corresponding pre-configured specified quantity of allowed receiver identifiers according to the sender identifier and the emoticon identifier;

obtaining a candidate receiver identifier;

comparing the candidate receiver identifier with the allowed receiver identifier; and sending the selected emoticon identifier to the candidate receiver identifier, if the candidate receiver identifier is the allowed receiver identifier.

Details of one or more embodiments of the present disclosure are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions in the exemplary embodiments of the present disclosure or in the existing technology more clearly, the following briefly describes the accompanying drawings required for describing the exemplary embodiments of the present disclosure or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and exemplary embodiments. It should be understood that these exemplary embodiments described herein are merely used to explain the present disclosure but are not intended to limit the present disclosure.

Figure 1:
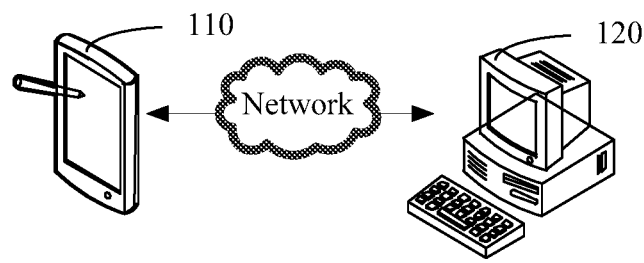
FIG. 1 is a schematic diagram of application environment of the present disclosure according to an exemplary embodiment.

FIG. 1 is a schematic diagram of application environment of performing an emoticon sending method according to an exemplary embodiment of the present disclosure. As shown in FIG. 1, the application environment may include a first terminal 110 and a second terminal 120 that are communicatively connected to each other via a network. The first terminal 110 and the second terminal 120 may each be a mobile phone, a tablet computer, a personal digital assistant, a wearable device, or any electronic device. The first terminal 110 corresponds to a first user, and the second terminal 120 corresponds to a second user.

In an exemplary embodiment, the first user logins into the first terminal 110 as a first user identifier and selects an emoticon. If this emotion is one to be sent first time, the first terminal 110 may receive a selected emoticon identifier. Then, according to the first user identifier and the emoticon identifier, the first terminal 110 may obtain a corresponding pre-configured specified quantity of allowed receiver identifiers. The first terminal 110 may also obtain a candidate receiver identifier and determine whether the candidate receiver identifier is one of the allowed receiver identifiers. If yes, the first terminal 110 sends the selected emoticon identifier to the second terminal 120 on which the second user (who is one of the allowed receiver identifiers) locates. If not, as will be described in detail later, a prompt is given in the first terminal 110 and informs the first user that sending the emoticon fails and an emoticon identifier can only be sent to an instant messaging account of a third user, who is an allowed receive identifier.

The first terminal 110 and the second terminal 120 may be used as send ends, or may be used as receive ends.

In some embodiments, the application environment may include a server (FIG. 2B), the first terminal 110, and the second terminal 120, where the emoticon identifier is sent from the first terminal 110 to the second terminal 120 by using the server.

Figure 2A:
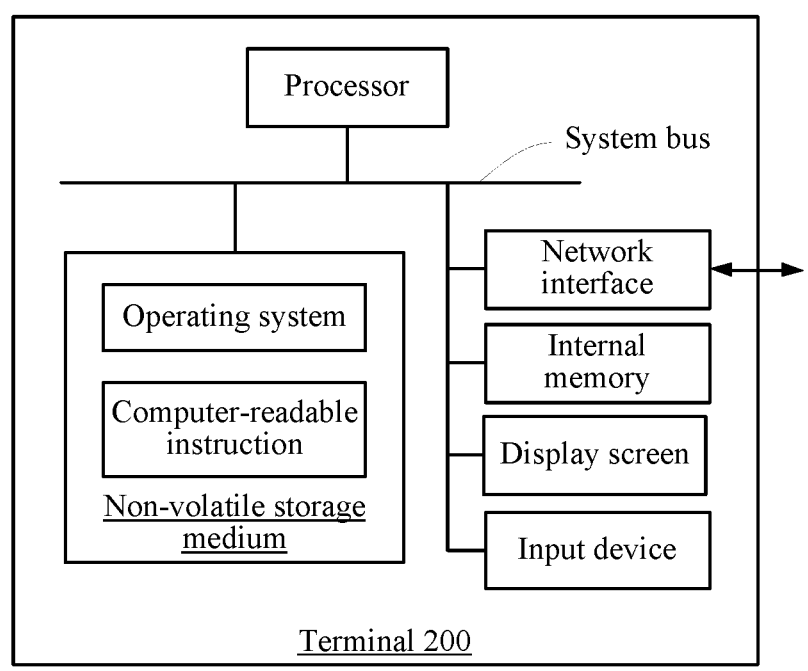
FIG. 2A is a schematic diagram of the internal structure of a terminal according to an exemplary embodiment.

FIG. 2A is a schematic diagram of the internal structure of a computer device (a terminal 200) according to an exemplary embodiment. As shown in FIG. 2A, the terminal 200 may include a processor, a non-volatile storage medium, a memory, and a network interface, a display screen, and an input apparatus that are connected by using a system bus. The non-volatile storage medium of the terminal 200 stores an operating system and a computer-readable instruction. When the computer-readable instruction is executed by the processor, an emoticon sending method is implemented. The processor may be configured to provide computing and control capabilities to support running of the entire terminal 200. The memory in the terminal 200 provides an environment for running the emoticon sending apparatus in non-volatile storage medium. The network interface may be configured to perform network communications on the server or the terminal, for example, send the emoticon identifier to the server, and receive data that the server returns. The display screen of the terminal 200 may be a liquid crystal display screen, an e-ink display screen, or the like. The input apparatus may be a touch layer covering the display screen, or may be a key, a track ball, or a touchpad disposed on a housing of the terminal 200, or may be an external keyboard, touchpad, or mouse. The terminal 200 may be a mobile phone, a tablet computer, a personal digital assistant, a wearable device, or the like. A person skilled in the art may understand that, in the structure shown in FIG. 2A, only a block diagram of a partial structure related to a solution in this application is shown, and does not constitute a limit to the terminal 200 to which the solution in this application is applied. Specifically, the terminal 200 may include more components or fewer components than those shown in the figure, or some components may be combined, or a different component deployment may be used.

Moreover, in general, the memory of the terminal 200 corresponds to a non-transitory computer readable storage medium including volatile and non-volatile media, and removable and non-removable media implemented by using any method or technology used for storing information such as a computer readable instruction, a data structure, a program module or other data. The computer readable storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices.

Figure 2B:
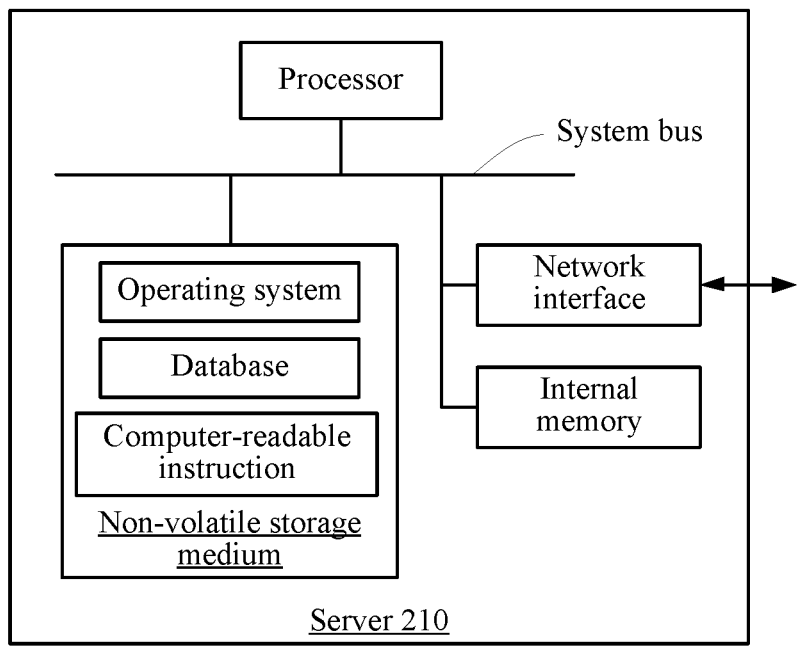
FIG. 2B is a schematic diagram of the internal structure of a server according to an exemplary embodiment.

FIG. 2B is a schematic diagram of the internal structure of a computer device (a server 210) according to an exemplary embodiment. As shown in FIG. 2B, the server 210 may include a processor, a non-volatile storage medium, a memory, and a network interface that are connected by using a system bus. The non-volatile storage medium of the server 210 stores an operating system, a database and a computer-readable instruction, the database storing an emoticon identifier and a corresponding emoticon, a user identifier, and the like. When the computer-readable instruction is executed by the processor, an emoticon sending method is implemented. The processor of the server 210 may be configured to provide computing and control capabilities to support running of the entire server. The memory of the server 210 provides an environment for running the emoticon sending apparatus in non-volatile storage medium. The network interface of the server 210 may be configured to communicate with an external terminal (the terminal 200) by using a network connection, for example, receive an emoticon identifier sending request that the terminal 200 sends and return an emoticon to the terminal 200.

The server 210 may be an independent server, a server cluster formed by a plurality of servers that respectively implement different functions, or a cloud computer center. A person skilled in the art may understand that, the structure of FIG. 2B only shows a block diagram of a partial structure related to a solution in this application, and does not constitute a limit to the server 210 to which the solution in this application is applied. Specifically, the server 210 may include more components or fewer components than those shown in the figure, or some components may be combined, or a different component deployment may be used.

Moreover, in general, the memory of the server 210 corresponds to a non-transitory computer readable storage medium including volatile and non-volatile media, and removable and non-removable media implemented by using any method or technology used for storing information such as a computer readable instruction, a data structure, a program module or other data. The computer readable storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices.

The computer device employed in exemplary embodiments of the present disclosure may be the terminal, the server, or a combination of the server and the terminal such that the terminal is communicatively connected to the server via a network.

Figure 3:
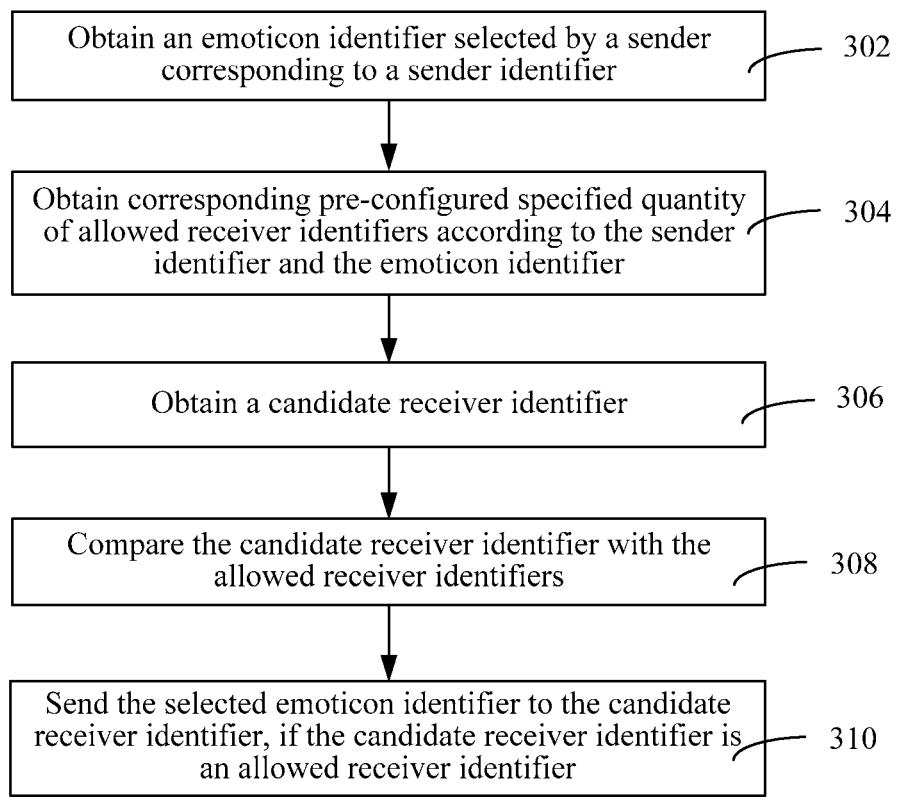
FIG. 3 is a flowchart of an emoticon sending method according to an exemplary embodiment.

FIG. 3 is a flowchart of an emoticon sending method according to an exemplary embodiment. As shown in FIG. 3, this exemplary emoticon sending method may be performed either on a terminal or on a server, and includes at least the following operations:

At Step S302, a terminal obtains an emoticon identifier selected by a sender corresponding to a sender identifier.

In this exemplary embodiment, the sender identifier is used to uniquely represent a sender identity. The sender identifier may be one or more types of a letter of an alphabet, a number, a character, or the like, or any combination thereof. The sender identifier may represent an instant messaging account, a mobile telephone number, an e-mail box, an ID card number, or the like of a user, or anything that is able to identify the sender.

The emoticon identifier may be used as a character string or the like to uniquely represent an emoticon. The character string of the emoticon identifier may include one or more types of a letter of an alphabet, a number, a character, or the like, or any combination thereof. The emoticons may be a variety of image icons, including but not limited to, such as a kiss, a hug, a hand shake, a smile, or a bomb throwing.

The server stores a variety of emoticon installation packages, and marks each of the emotion installation packages with a limitation type. The limitation type is a type that is used to limit a relationship of the two sides using the emoticons. For example, if the limitation type is lover, the emoticon may only be used between people having an intimate relationship. If the limitation type is family member, the emoticon may only be used among the members of a family. Further, the server establishes a corresponding relationship between any one of the limitation types and a specified quantity of allowed receiver identifiers. The specified quantity of allowed receiver identifiers are the number of the emoticon identifiers that are allowed to be received by a receiver.

The terminal may download an emoticon installation package from the server, and installs the downloaded emoticon installation package, thereby obtaining corresponding emoticons, emoticon identifiers, a limitation type and a specified quantity. The terminal obtains the emoticon identifier selected by the sender corresponding to the sender identifier. In addition, the terminal may obtain a purchase request for an emoticon, and downloads such an emotion, or a corresponding emoticon, according to the purchase request from the server.

In an exemplary embodiment, after obtaining an emoticon identifier selected by a sender corresponding to a sender identifier, the terminal determines whether the selected emoticon identifier is the emoticon identifier to be sent for the first time. If yes, the terminal obtains an allowed receiver identifier (which is an emoticon identifier that is allowed to be received by the receiver), and records a corresponding relationship among the sender identifier, the emoticon identifier and the allowed receiver identifier. If not, the terminal obtains a corresponding pre-configured specified quantity of the allowed receiver identifiers according to the sender identifier and the emoticon identifier.

In this exemplary embodiment, when it is determined that the selected emoticon identifier is to be sent for the first time, first prompt information of the emoticon identifier configured for the allowed receiver identifiers is displayed. Then, a trigger operation for the first prompt information is obtained. According to the trigger operation, the limitation type corresponding to the emoticon identifier is obtained. According to the limitation type, a specified quantity is obtained. For example, if the limitation type is lover, the specified quantity of the allowed receiver identifiers is 1. If the limitation type is family member, the specified quantity of the allowed receiver identifiers may be 1 or more (such as 3, or 5).

After obtaining the allowed receiver identifier corresponding to the sender identifier, the terminal records information regarding a corresponding relationship among the sender identifier, the emoticon identifier and the allowed receiver identifier. The terminal may either store the information locally (e.g., on a memory of the terminal) or upload the information to the server.

The receiver identifier is used to uniquely represent the identify of a receiver. The receiver identifier may be an instant messaging account, a mobile telephone number, an e-mail box, an ID card number, or the like of the receiver. The allowed receiver identifier is a receiver identifier allowed by a sender to receive a specific emoticon identifier.

The sender identifier and the receiver identifier are both user identifiers. The sender identifier is the user identifier using as a sender. The receiver identifier is the user identifier using as a receiver.

At Step S304, the terminal obtains a corresponding pre-configured specified quantity of allowed receiver identifiers according to the sender identifier and the emoticon identifier. In this exemplary embodiment, the corresponding pre-configured specified quantity may be one or more.

The step of obtain the corresponding allowed receiver identifiers according to the emoticon identifier includes: obtaining the pre-configured specified quantity of the allowed receiver identifiers corresponding to the sender identifier and the emoticon identifier, according to the sender identifier and the emoticon identifier locally (from the terminal) or from the server.

In this exemplary embodiment, a corresponding relationship among the sender identifier, the emoticon identifier and the allowed receiver identifier is obtained locally (from the terminal) or from the server. A corresponding allowed receiver identifier is obtained from the corresponding relationship among the sender identifier, the emoticon identifier and the allowed receiver identifier according to the sender identifier and the emoticon identifier.

In some embodiments, corresponding relationships among the sender identifier, the emoticon identifier and the allowed receiver identifier may be obtained from both the terminal and the server. Then, a judgement is made as to whether the corresponding relationship on the terminal among the sender identifier, the emoticon identifier and the allowed receiver identifier is the same as that on the server. If the corresponding relationship on the terminal is the same as that on the server, obtain the allowed receiver identifier corresponding to the sender identifier and the emoticon identifier by using any one of the corresponding relationships among the sender identifier, the emoticon identifier and the allowed receiver identifier. If the corresponding relationship on the terminal is different from that on the server, a time stamp of the corresponding relationship on the terminal is compared with a time stamp of the corresponding relationship on the server. The allowed receiver identifier corresponding to the sender identifier and the emoticon identifier is obtained by using the corresponding relationship, the time stamp of which is later.

In some embodiments, if there is no local corresponding relationship among the sender identifier, the emoticon identifier and the allowed receiver identifier (no such a corresponding relationship on the terminal), the corresponding relationship among the sender identifier, the emoticon identifier and the allowed receiver identifier is downloaded from the server. The allowed receiver identifier corresponding to the sender identifier and the emoticon identifier is obtained according to the downloaded corresponding relationship.

At Step S306, the terminal obtains a candidate receiver identifier.

In this exemplary embodiment, the obtaining of the candidate receiver identifier may include obtaining a receiver identifier as the candidate receiver identifier from a current session interface; or, obtaining a selected user identifier from the contacts of the sender identifier as the candidate receiver identifier.

At Step S308, the terminal compares the candidate receiver identifier with the allowed receiver identifiers.

At Step S310, the terminal sends the selected emoticon identifier to the candidate receiver identifier, if the candidate receiver identifier matches with one of the allowed receiver identifiers.

In this exemplary embodiment, if the candidate receiver identifier is the allowed receiver identifier, the terminal displays a selected emoticon identifier on the session interface, receives a sending instruction, and sends the emoticon identifier to another terminal (a receiving terminal) on which the candidate receiver identifier locates, according to the sending instruction.

The terminal on which the receiver identifier locates, obtains an emoticon corresponding to the emoticon identifier locally when it received the emoticon identifier, and displays the emoticon, or obtains an emoticon corresponding to the emoticon identifier from the server, and displays the emoticon.

As described above, the emoticon sending method obtains a selected emoticon identifier, obtains a corresponding allowed receiver identifier according to the sender identifier and the emoticon identifier, compares the candidate receiver identifier with the allowed receiver identifier, and if the candidate receiver identifier is the allowed receiver identifier, sends the selected emoticon identifier to the candidate receiver identifier.

According to the method of the present disclosure, since the emoticon corresponding to the emoticon identifier is ensured to be only transferred to the allowed receiver, an error rate of an information transformation is reduced, and erroneously transferring the meaning that the emoticon carries is also avoided, thereby preventing the social problems such as, wrong information transformation, from occurring and improving social securities.

Figure 5:
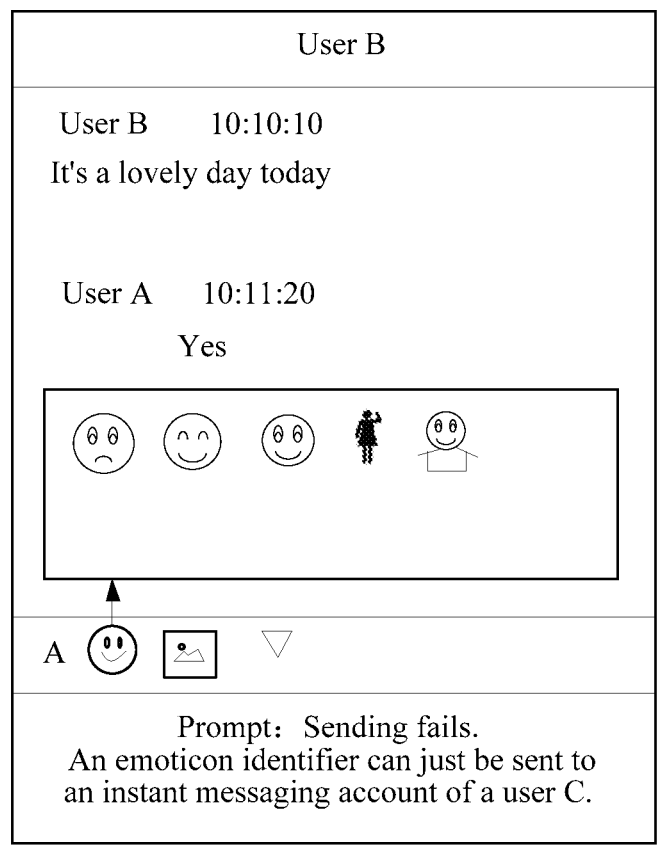
FIG. 5 is a schematic diagram of showing a prompt when an emoticon cannot be sent.

If the candidate receiver identifier is not the allowed receiver identifier, prompt information may be displayed. As shown in FIG. 5, the prompt information may include messages such as "Sending to the candidate receiver identifier fails," "send to the allowed receiver identifier," and the like. In this exemplary embodiment, the prompt information may further include: "send to the allowed receiver identifier," "display the allowed receiver identifier," "a terminal obtains a selected allowed receiver identifier," and "send the emoticon identifier to the selected allowed receiver identifier," and the like. For example, if an emoticon is "baby, I love you," and the candidate receiver identifier is not a lover or an intimate partner, namely, not the allowed receive identifier, the prompt information may be given: The emoticon "baby, I love you" can merely be sent to the allowed receiver identifier A.

According to the method of the present disclosure, by prompting a user that sending to the candidate receiver identifier fails, it conveniently informs the user that the user can select another emoticon without sending out a wrong emoticon. Also, by prompting the sender with a message such as: "send an emoticon to the allowed receiver identifier," it is convenient and safe for the user to send such an emoticon to the allowed receiver identifier without searching whom the emoticon should be sent to, thereby improving communication efficiency.

The emoticon sending method described above may further include: obtaining a non-allowed receiver identifier, and recording a corresponding relationship among the sender identifier, the emoticon identifier and the non-allowed receiver identifier, when it is determined that the selected emoticon identifier is the emoticon identifier to be sent for the first time.

In this exemplary embodiment, the non-allowed receiver identifier is a receiver identifier that is not allowed to receive the emoticon. By setting the non-allowed receiver identifier, the emoticon corresponding to the emoticon identifier can be prevented from being sent to the non-allowed receiver identifier, thereby avoiding an erroneous information transformation, and improving accuracy of an information transformation. The method of the present disclosure also includes regularly updating the non-allowed receiver identifier corresponding to the sender identifier and the emoticon identifier.

The emoticon sending method described above may further include: starting timing, when configuring the allowed receiver identifier corresponding to the emoticon identifier; receiving an update request of the allowed receiver identifier for the emoticon identifier by a sender corresponding to the sender identifier, after the timing exceeds a preset time; and updating the allowed receiver identifier corresponding to the sender identifier and the emoticon identifier according to the update request.

In this exemplary embodiment, the preset time may be set according to actual needs, such as 1 month, 3 months, or 6 months. By regularly updating the allowed receiver identifier, it is convenient to update data, and the accuracy of an information transformation can be ensured. For example, if a relationship between the lovers changes, by updating the allowed receiver identifier, an emoticon that shows love will be prevented from being sent to a former lover, thereby improving accuracy of the information transformation.

The emoticon sending method described above may further include: after the step of obtaining a corresponding pre-configured specified quantity of allowed receiver identifiers according to the sender identifier and the emoticon identifier, displaying the pre-configured specified quantity of the allowed receiver identifiers corresponding to the sender identifier and the emoticon identifier; obtaining a first receiver identifier selected from the pre-configured specified quantity of the allowed receiver identifiers corresponding to the sender identifier and the emoticon identifier; and sending the emoticon identifier to the selected first receiver identifier.

In this exemplary embodiment, after the allowed receiver identifiers are obtained, the allowed receiver identifiers are displayed directly to the sender, and after a first receiver identifier selected by the sender corresponding to the sender identifier is obtained, the emoticon identifier is sent to the selected first receiver identifier, by which the information transformation is accurate and the communication efficiency is improved.

In an exemplary embodiment, the emoticon sending method described above may include: obtaining the sender identifier and the candidate receiver identifier, obtaining the corresponding emoticon identifier and the allowed receiver identifier according to the sender identifier, and hiding the emoticon identifier that the candidate receiver identifier cannot receive on the emoticon selecting interface, when an identifier to be received is determined as not the allowed receiver identifier.

According to the method of the present disclosure, by hiding an emoticon that is not suitable to be sent on the emoticon selecting interface, emoticon record space is saved, and an error rate of an information transformation is also reduced.

Next, an implementation process of an emoticon sending method is described with reference to a specific application scenario. Assuming the emoticon sending method is applied to an instant messaging application, the sender identifier is the instant messaging account of a user A, and the candidate receiver identifier is the instant messaging account of a user B. The user A uses a first terminal for login, downloads an emoticon of which the limitation type is lover from a server, and installs the emoticon.

Figure 4:
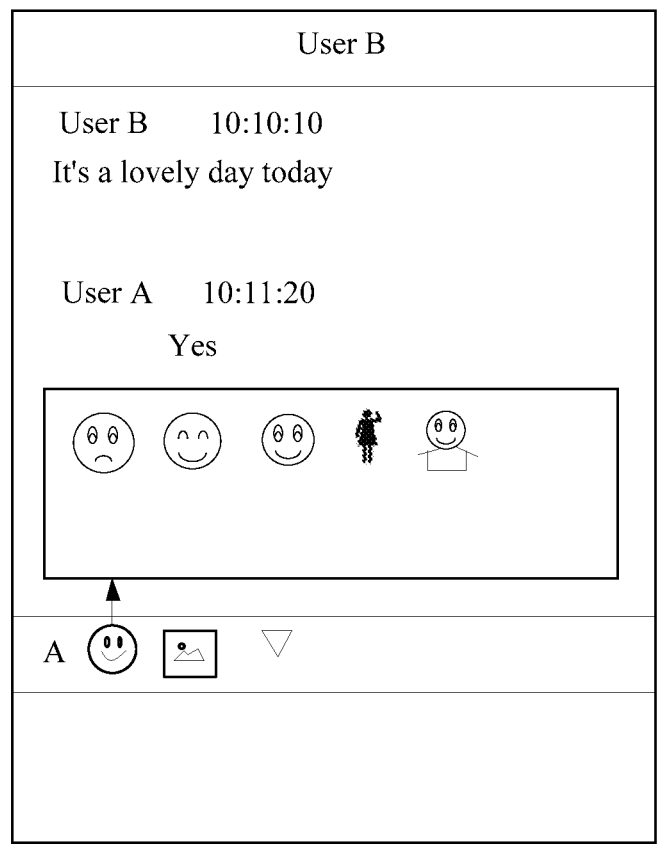
FIG. 4 is a schematic diagram for sending an emoticon according to an exemplary embodiment.

As shown in FIGS. 4 and 5, on a session interface between the user A and the user B, a trigger operation of the user A for an emoticon entry is obtained and an emoticon selecting interface is entered. When it is determined that the selected emoticon of a lover type is to be sent for the first time, a prompt is given that an allowed receiver identifier needs to be specified. If the selected lover type emoticon is not to be sent for the first time, an instant messaging account of a user C corresponding the allowed receiver identifier is obtained according to the instant messaging account and the emoticon identifier of the user A. Then, the instant messaging account of the user C is compared with the instant messaging account of the user B, thereby obtaining that the instant messaging account of the user B is not the allowed receiver identifier. Thus, a prompt is given that: the emoticon identifier cannot be sent to the user B, and the emoticon identifier can just be sent to the instant messaging account of the user C.

Figure 6:
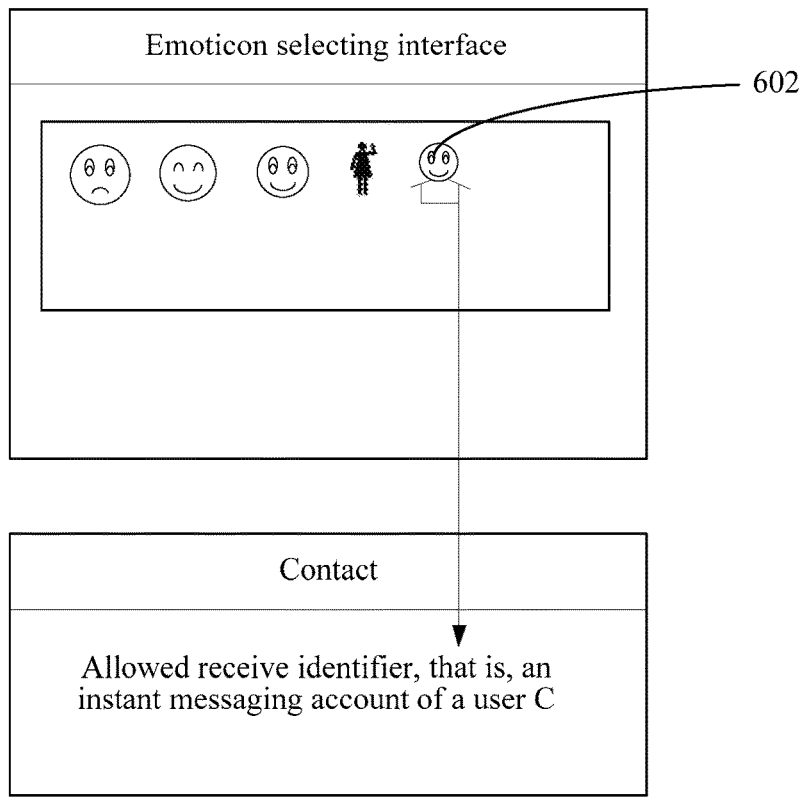
FIG. 6 is a schematic diagram for sending an emoticon according to an exemplary embodiment.

As shown in FIG. 6, after the user A selects an emoticon 602, a corresponding allowed receive identifier (which is the instant messaging account of the user C) is directly obtained according to the instant messaging account of the user A and the emoticon identifier. The instant messaging account of the user C is directly displayed, a session interface between the user A and the user C is established, and an emoticon corresponding to the emoticon identifier is displayed in an input box of the user A.

Figure 7:
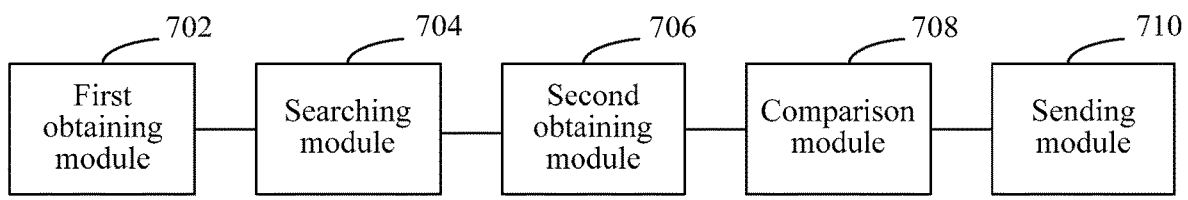
FIG. 7 is a structural block diagram of a computer device performing emoticon sending operations according to an exemplary embodiment.

FIG. 7 is a structural block diagram of an emoticon sending apparatus (a computer device) according to an exemplary embodiment. As shown in FIG. 7, the emoticon sending apparatus may include a first obtaining module 702, a searching module 704, a second obtaining module 706, a comparison module 708 and a sending module 710. The first obtaining module 702 may be configured to obtain an emoticon identifier selected by a sender corresponding to a sender identifier. The searching module 704 may be configured to obtain a corresponding allowed receiver identifier, according to the sender identifier and the emoticon identifier.

In this exemplary embodiment, the searching module 704 may be further configured to obtain the allowed receiver identifier corresponding to the sender identifier and the emoticon identifier locally (from a terminal) or from a server according to the sender identifier and the emoticon identifier. A corresponding relationship among the sender identifier, the emoticon identifier and the allowed receiver identifier is obtained locally (e.g., from a terminal) or from the server, and the corresponding allowed receiver identifier is obtained from the corresponding relationship among the sender identifier, the emoticon identifier and the allowed receiver identifier according to the sender identifier and the emoticon identifier.

In some embodiments, corresponding relationships among the sender identifiers, the emoticon identifiers and allowed receiver identifiers may be obtained from both the terminal and the server. It is determined whether or not the corresponding relationship on the terminal is the same as that on the server. If the corresponding relationship on the terminal is the same as that on the server, the allowed receiver identifier corresponding to the sender identifier and the emoticon identifier is obtained by using any one of the corresponding relationships among the sender identifiers, the emoticon identifiers and the allowed receiver identifiers. If the corresponding relationship on the terminal is different from that on the server, a time stamp of the corresponding relationship on the terminal is compared with a time stamp of the corresponding relationship on the server, and the allowed receiver identifier corresponding to the sender identifier and the emoticon identifiers is obtained by using the corresponding relationship of which the time stamp is later.

In some embodiments, if there is no corresponding relationship among the sender identifier, the emoticon identifier and the allowed receiver identifiers on the terminal, the corresponding relationship among the sender identifier, the emoticon identifier and the allowed receiver identifier may be downloaded from the server, and the allowed receiver identifier corresponding to the sender identifier and the emoticon identifier may be obtained according to the downloaded corresponding relationship among the sender identifier, the emoticon identifier and the allowed receiver identifier. The obtained corresponding allowed receiver identifier may be one or more.

The second obtaining module 706 may be configured to obtain a candidate receiver identifier. In this exemplary embodiment, the obtaining module 706 obtains a receiver identifier as the candidate receiver identifier from a current session interface, or obtains a user identifier selected from contacts of the sender identifier as the candidate receiver identifier. The comparison module 708 may be configured to compare the allowed receiver identifier with the candidate receiver identifier. The sending module 710 may be configured to send the selected emoticon identifier to the candidate receiver identifier, if the candidate receiver identifier is the allowed receiver identifier.

In this exemplary embodiment, if the candidate receiver identifier is the allowed receiver identifier, a selected emoticon identifier is displayed on the session interface, a sending instruction is received, and, according to the sending instruction, the emoticon identifier is sent to the terminal on which the candidate receiver identifier locates.

As described above, the emoticon sending apparatus obtains a selected emoticon identifier, obtains a corresponding allowed receiver identifier according to the sender identifier and the emoticon identifier, compares the candidate receiver identifier with the allowed receiver identifier, and if the candidate receiver identifier is the allowed receiver identifier, sends the selected emoticon identifier to the candidate receiver identifier. Thus, by transferring the emoticon corresponding to the emoticon identifier to the allowed receiver, an error rate of an information transformation is reduced, and erroneously transferring the meaning that the emoticon carries is prevented. As a result, the social problems of the wrong information transformation can be avoided and social securities can be ensured.

Figure 8:
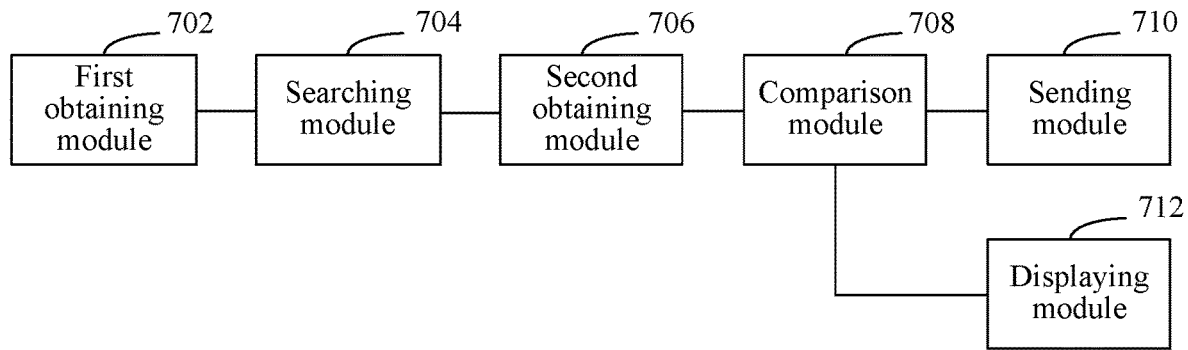
FIG. 8 is a structural block diagram of a computer device performing emoticon sending operations according to an exemplary embodiment.

FIG. 8 is a structural block diagram of an emoticon sending apparatus (a computer device) according to an exemplary embodiment. As shown in FIG. 8, the emoticon sending apparatus may include a first obtaining module 702, a searching module 704, a second obtaining module 706, a comparison module 708, a sending module 710, and a displaying module 712. The displaying module 712 may be configured to display prompt information if the candidate receiver identifier is not the allowed receiver identifier. The prompt information may include messages such as "Sending to the candidate receiver identifier fails," "sending to the specified receiver identifier is allowed," and the like.

In this exemplary embodiment, the prompt information may also include messages such as: "Send to the allowed receiver identifier," "display the allowed receiver identifier," "a terminal obtains a selected allowed receiver identifier," "send the emoticon identifier to the selected allowed receiver identifier," and the like. By displaying the prompt massage of "Sending to the candidate receiver identifier fails," the user can conveniently select another emoticon without sending out the wrong emoticon. By displaying the prompt message of "Send to the allowed receiver identifier," it is convenient and safe for the user to send an emoticon to the allowed receiver identifier without searching whom the emoticon should be sent to, thereby improving communication efficiency.

Figure 9:
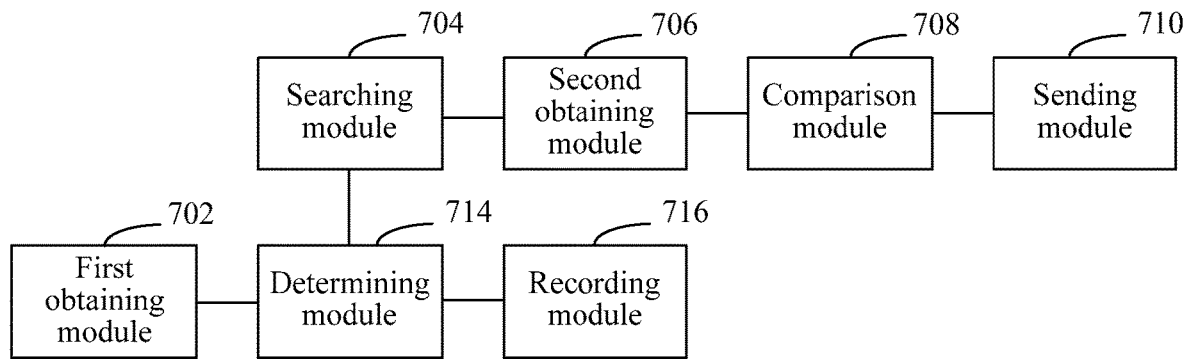
FIG. 9 is a structural block diagram of a computer device performing emoticon sending operations according to an exemplary embodiment.

FIG. 9 is a structural block diagram of an emoticon sending apparatus (a computer device) according to an exemplary embodiment. As shown in FIG. 9, the emoticon sending apparatus may include a first obtaining module 702, a searching module 704, a second obtaining module 706, a comparison module 708, a sending module 710, a determining module 714, and a recording module 716.

The determining module 714 may be configured to, after obtaining an emoticon identifier selected by a sender corresponding to a sender identifier, determine whether or not the selected emoticon identifier is the emoticon identifier to be sent for the first time. If yes, the recording module 716, which may be configured to obtain a configured allowed receiver identifier, records the corresponding relationship among the sender identifier, the emoticon identifier and the allowed receiver identifier. If not, the searching module 704 may be configured to obtain the corresponding allowed receiver identifier according to the sender identifier and the emoticon identifier.

The recording module 716 may be further configured to obtain a configured non-allowed receiver identifier when the selected emoticon identifier is determined as the emoticon identifier to be sent for the first time, and record a corresponding relationship among the sender identifier, the emoticon identifier and the non-allowed receiver identifier.

In this exemplary embodiment, when it is determined that the selected emoticon identifier is to be sent for the first time, first prompt information of the emoticon identifier configured for the allowed receiver identifiers is displayed. Then, a trigger operation for the first prompt information is obtained. According to the trigger operation, the limitation type corresponding to the emoticon identifier is obtained. According to the limitation type, a specified quantity is obtained. For example, if the limitation type is lover, the specified quantity of the allowed receiver identifiers is 1. If the limitation type is family member, the specified quantity of the allowed receiver identifiers may be 1 or more.

The non-allowed receiver identifier is a receiver identifier that is not allowed to receive an emoticon. By setting the non-allowed receiver identifier, the emoticon corresponding to the emoticon identifier will not be sent to the non-allowed receiver identifier, thereby avoiding an erroneous information transformation, and improving accuracy of an information transformation. The emoticon sending apparatus may regularly update the non-allowed receiver identifier corresponding to the sender identifier and the emoticon identifier.

Figure 10:
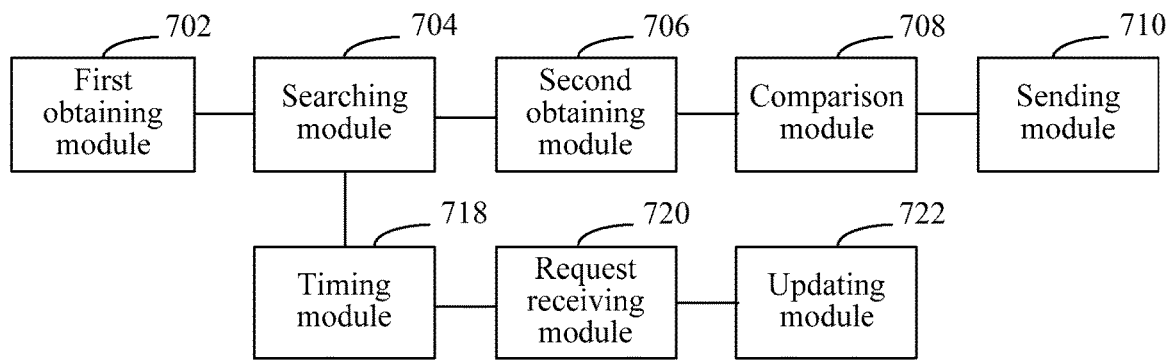
FIG. 10 is a structural block diagram of a computer device performing emoticon sending operations according to an exemplary embodiment.

FIG. 10 is a structural block diagram of an emoticon sending apparatus (a computer device) according to an exemplary embodiment. As shown in FIG. 10, the emoticon sending apparatus may include a first obtaining module 702, a searching module 704, a second obtaining module 706, a comparison module 708, a sending module 710, a timing module 718, a request receiving module 720, and an updating module 722.

The timing module 718 may be configured to start timing when configuring the allowed receiver identifier corresponding to the sender identifier and the emoticon identifier. The request receiving module 720 may be configured to receive, when the timing exceeds a preset time, an update request for the emoticon identifier of the allowed receiver identifier by a sender corresponding to the sender identifier. The updating module 722 may be configured to update the allowed receiver identifier corresponding to the sender identifier and the emoticon identifier, according to the update request.

In this exemplary embodiment, the preset time may be set according to actual needs or a given period of time, such as 1 month, 3 months, or 6 months. By regularly updating the allowed receiver identifier, data are updated conveniently and accuracy of an information transformation can be ensured. For example, after a relationship between lovers changes, by updating the allowed receiver identifier, an emoticon, which is only allowed for the lovers, will not be sent to a wrong object, for example, a former lover, thereby improving accuracy of the information transformation.

Figure 11:
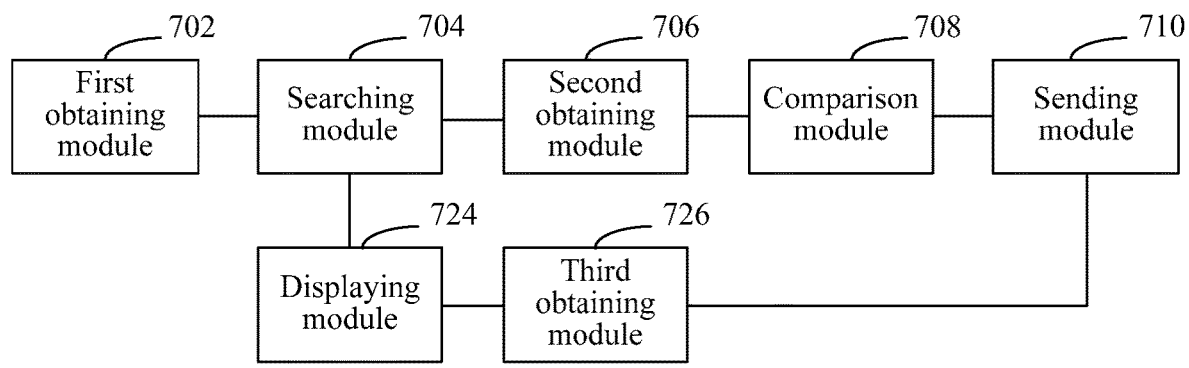
FIG. 11 is a structural block diagram of a computer device performing emoticon sending operations according to an exemplary embodiment.

FIG. 11 is a structural block diagram of an emoticon sending apparatus (a computer device) according to an exemplary embodiment. As shown in FIG. 11, the emoticon sending apparatus may include a first obtaining module 702, a searching module 704, a second obtaining module 706, a comparison module 708, a sending module 710, a displaying module 724, and a third obtaining module 726.

The displaying module 724 may be configured to display, an allowed receiver identifier corresponding to the sender identifier and the emoticon identifier, after the obtaining a corresponding allowed receiver identifier according to the sender identifier and the emoticon identifier. The third obtaining module 726 may be configured to obtain the first receiver identifier selected from the allowed receiver identifier corresponding to the sender identifier and the emoticon identifier. The sending module 710 may be further configured to send the emoticon identifier to the selected first receiver identifier.

In this exemplary embodiment, after the allowed receiver identifier is obtained, the allowed receiver identifier is displayed directly, and after a first receiver identifier selected by a sender corresponding to the sender identifier is obtained, the emoticon identifier is sent to the selected first receiver identifier, such that an information transformation is accurate, thereby improving sending efficiency.

The emoticon sending apparatus may further include a hiding module. When the first obtaining module 702 obtains a sender identifier and a candidate receiver identifier, the searching module 704 obtains a corresponding emoticon identifier and an allowed receiver identifier according to the sender identifier, and the comparison module 708 determines a candidate identifier as a non-allowed receiver identifier, the hiding module hides the emoticon identifier that the candidate receiver identifier cannot receive on the emoticon selecting interface.

In an exemplary embodiment, the emoticon sending apparatus may include any possible combination of the first obtaining module 702, the searching module 704, the second obtaining module 706, the comparison module 708, the sending module 710, the displaying module 712, the determining module 714, the recording module 716, the timing module 718, the request receiving module 720, the updating module 722, the displaying module 724, and the third obtaining module 726.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. The storage medium may be a magnetic disc, an optical disc, a read-only memory (Read-Only Memory, ROM), or the like.

The foregoing embodiments only show several implementations of the present disclosure and are described in detail, but they should not be construed as a limit to the patent scope of the present disclosure. It should be noted that, a person of ordinary skill in the art may make various changes and improvements without departing from the ideas of the present disclosure, which shall fall within the protection scope of the present disclosure. Therefore, the protection scope of the patent of the present disclosure shall be subject to the claims.

What is claimed is:

1. A method performed at a first terminal that is communicatively connected to a server, the first terminal including one or more processors and memory storing instructions to be executed by the one or more processors, the first terminal is associated with a first user having a first user identifier in an instant messaging application, the method comprising:
   receiving, from the first user via the instant messaging application, a selection of a first emoticon;
   in response to the selection of the first emoticon, obtaining an identification of one or more allowed receiver identifiers that are allowed to receive the first emoticon from the first user identifier via the instant messaging application, wherein each of the one or more allowed receiver identifiers is associated with a respective user account on the instant messaging application and represents a user-selected contact of the first user on the instant messaging application, and the one or more allowed receiver identifiers are pre-configured by the first user and stored at the server;
   receiving from the first user a selection of a candidate receiver identifier to receive the first emoticon via the instant messaging application, wherein the candidate receiver identifier is associated with a second user of the instant messaging application;
   in response to the user selection of the candidate receiver identifier, comparing the candidate receiver identifier with the one or more allowed receiver identifiers; and
   in accordance with a determination that the candidate receiver identifier does not match any one of the one or more allowed receiver identifiers:
      displaying, on the instant messaging application, an indication that the first emoticon cannot be sent to the one or more candidate receiver identifier; and
      displaying, on the instant messaging application, the one or more allowed receiver identifiers that are allowed to receive the first emoticon.

2. The method according to claim 1, further comprising:
   in accordance with a determination that the candidate receiver identifier matches any one of the one or more allowed receiver identifiers, sending the first emotion to the second user via the instant messaging application.

3. The method according to claim 1, further comprising:
   receiving, from the first user via the instant messaging application, a user selection of a second emoticon;
   in response to the receiving, determining whether the second emoticon is an emoticon to be sent for the first time;
   in accordance with a determination that the second emoticon is an emoticon to be sent for the first time:
      obtaining from the first user an allowed receiver identifier that is allowed to receive the second emoticon from the first user identifier via the instant messaging application; and
      recording a corresponding relationship among the first user identifier, the second emoticon, and the allowed receiver identifier; and
   in accordance with a determination that the second emoticon is not an emoticon to be sent for the first time:
      obtaining an identification of one or more first allowed receiver identifiers according to the first user identifier and the second emoticon.

4. The method according to claim 3, further comprising:
   obtaining, from the first user, a second receiver identifier that is not allowed to receive the second emotion from the first user via the instant messaging application; and
   in accordance with a determination that the second emotion is an emoticon to be sent for the first time, recording a corresponding relationship among the first user identifier, the second emoticon and the second receiver identifier.

5. The method according to claim 1, wherein the pre-configuration by the first user includes a preset time, the method further comprising:
   when a current time exceeds the preset time, receiving from the server a request to update the one or more allowed receiver identifiers that are allowed to receive the first emoticon from the first user identifier via the instant messaging application;

in response to the request, receiving from the first user an identification of one or more modified receiver identifiers; and updating the allowed receiver identifiers according to the update request.

6. The method according to claim 1, further comprising:
after obtaining the identification of the one or more allowed receiver identifiers that are allowed to receive the first emoticon from the first user identifier via the instant messaging application:
  displaying, to the first user via the instant messaging application, the one or more allowed receiver identifiers and the first emoticon;
  obtaining, from the first user via the instant messaging application, a first receiver identifier selected from the one or more allowed receiver identifiers; and
sending the first emoticon to the first receiver identifier via the instant messaging application.

7. The method according to claim 1, wherein obtaining the identification of one or more allowed receiver identifiers that are allowed to receive the first emoticon from the first user comprises obtaining the identification from the server.

8. The method according to claim 1, further comprising:
in accordance with a determination that the candidate receiver identifier does not match any one of the one or more allowed receiver identifiers, hiding the first emoticon from display on the instant messaging application.

9. A computer device, comprising a memory and a processor, the memory storing computer-readable instructions that, when executed by the processor, cause the computer device to perform operations comprising:
  receiving, from the first user via the instant messaging application, a selection of a first emoticon;
  in response to the selection of the first emoticon, obtaining an identification of one or more allowed receiver identifiers that are allowed to receive the first emoticon from the first user identifier via the instant messaging application, wherein each of the one or more allowed receiver identifiers is associated with a respective user account on the instant messaging application and represents a user-selected contact of the first user on the instant messaging application, and the one or more allowed receiver identifiers are pre-configured by the first user and stored at the server;
  receiving from the first user a selection of a candidate receiver identifier to receive the first emoticon via the instant messaging application, wherein the candidate receiver identifier is associated with a second user of the instant messaging application;
  in response to the user selection of the candidate receiver identifier, comparing the candidate receiver identifier with the one or more allowed receiver identifiers; and
  in accordance with a determination that the candidate receiver identifier does not match any one of the one or more allowed receiver identifiers:
    displaying, on the instant messaging application, an indication that the first emoticon cannot be sent to the one or more candidate receiver identifier; and
    displaying, on the instant messaging application, the one or more allowed receiver identifiers that are allowed to receive the first emoticon.

10. The computer device according to claim 9, wherein the computer-readable instructions cause the computer device to perform operations comprising:
  in accordance with a determination that the candidate receiver identifier matches any one of the one or more allowed receiver identifiers, sending the first emotion to the second user via the instant messaging application.

11. The computer device according to claim 9, wherein the computer-readable instructions cause the computer device to perform operations comprising:
  receiving, from the first user via the instant messaging application, a selection of a second emoticon;
  in response to the receiving, determining whether the second emoticon is an emoticon to be sent for the first time;
  in accordance with a determination that the second emoticon is an emoticon to be sent for the first time:
    obtaining from the first user an allowed receiver identifier that is allowed to receive the second emoticon from the first user identifier via the instant messaging application; and
    recording a corresponding relationship among the first user identifier, the second emoticon, and the allowed receiver identifier; and
  in accordance with a determination that the second emoticon is not an emoticon to be sent for the first time:
    obtaining an identification of one or more first allowed receiver identifiers according to the first user identifier and the second emoticon.

12. The computer device according to claim 11, wherein the computer-readable instructions cause the computer device to perform operations comprising:
  obtaining, from the first user, a second receiver identifier that is not allowed to receive the second emoticon from the first user via the instant messaging application; and
  in accordance with a determination that the second emotion is an emoticon to be sent for the first time, recording a corresponding relationship among the first user identifier, the second emoticon and the second receiver identifier.

13. The computer device according to claim 9, wherein the pre-configuration by the first user includes a preset time, and the computer-readable instructions cause the computer device to perform operations comprising:
  when a current time exceeds the preset time, receiving from the server a request to update the one or more allowed receiver identifiers that are allowed to receive the first emoticon from the first user identifier via the instant messaging application;
  in response to the request, receiving from the first user an identification of one or more modified receiver identifiers; and
  updating the allowed receiver identifiers according to the update request.

14. The computer device according to claim 9, wherein the computer-readable instructions cause the computer device to perform operations comprising:
  after obtaining the identification of the one or more allowed receiver identifiers that are allowed to receive the first emoticon from the first user identifier via the instant messaging application;
  displaying, to the first user via the instant messaging application, the one or more allowed receiver identifiers and the first emoticon;
  obtaining, from the first user via the instant messaging application, a first receiver identifier selected from the one or more allowed receiver identifiers; and
  sending the first emoticon to the first receiver identifier.

15. The computer device according to claim 9, wherein obtaining the identification of one or more allowed receiver identifiers that are allowed to receive the first emoticon from the first user comprises obtaining the identification from the server.

16. The computer device according to claim 9, wherein the computer-readable instructions cause the computer device to perform operations comprising:

in accordance with a determination that the candidate receiver identifier does not match any one of the one or more allowed receiver identifiers, hiding the first emoticon from display on the instant messaging application.

17. A non-transitory computer readable storage medium storing a plurality of instructions configured for execution by a computer device having one or more processors, the plurality of instructions causing the computer device to perform operations comprising:

receiving, from the first user via the instant messaging application, a selection of a first emoticon;

in response to the selection of the first emoticon, obtaining an identification of one or more allowed receiver identifiers that are allowed to receive the first emoticon from the first user identifier via the instant messaging application, wherein each of the one or more allowed receiver identifiers is associated with a respective user account on the instant messaging application and represents a user-selected contact of the first user on the instant messaging application, and the one or more allowed receiver identifiers are pre-configured by the first user and stored at the server;

receiving from the first user a selection of a candidate receiver identifier to receive the first emoticon via the instant messaging application, wherein the candidate receiver identifier is associated with a second user of the instant messaging application;

in response to the selection of the candidate receiver identifier, comparing the candidate receiver identifier with the one or more allowed receiver identifiers; and in accordance with a determination that the candidate receiver identifier does not match any one of the one or more allowed receiver identifiers:

displaying, on the instant messaging application, an indication that the first emoticon cannot be sent to the one or more candidate receiver identifier; and displaying, on the instant messaging application, the one or more allowed receiver identifiers that are allowed to receive the first emoticon.

18. The non-transitory computer readable storage medium according to claim 17, wherein the computer device is a user terminal, a server, or a combination of the user terminal and the server.

* * * * *